United States Patent
Nie et al.

(10) Patent No.: US 11,204,847 B2
(45) Date of Patent: Dec. 21, 2021

(54) MACHINE LEARNING MODEL MONITORING

(71) Applicant: Microsoft Technology Licensing, LLC, Redmond, WA (US)

(72) Inventors: Kexin Nie, Sunnyvale, CA (US);
Yanbin Jiang, Sunnyvale, CA (US);
Yang Yang, Fremont, CA (US); Boyi Chen, Santa Clara, CA (US); Shilpa Gupta, Mountain View, CA (US);
Zheng Li, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 101 days.

(21) Appl. No.: 16/228,761

(22) Filed: Dec. 21, 2018

(65) Prior Publication Data
US 2020/0201727 A1 Jun. 25, 2020

(51) Int. Cl.
*G06F 11/00* (2006.01)
*G06F 11/22* (2006.01)
*G06N 20/20* (2019.01)

(52) U.S. Cl.
CPC ......... *G06F 11/2257* (2013.01); *G06N 20/20* (2019.01)

(58) Field of Classification Search
CPC ............................. G06F 11/2257; G06N 20/20
See application file for complete search history.

(56) References Cited

U.S. PATENT DOCUMENTS

| | | | |
|---|---|---|---|
| 2018/0253637 A1* | 9/2018 | Zhu | G06N 3/0454 |
| 2019/0138938 A1* | 5/2019 | Vasseur | H04L 41/147 |
| 2020/0074401 A1* | 3/2020 | Oliveira Almeida | G06N 20/00 |

OTHER PUBLICATIONS

"Discounted Cumulative Gain", Retrieved From: https://en.wikipedia.org/wiki/Discounted_cumulative_gain#Normalized_DCG, Retrieved On: Jan. 9, 2019, 5 Pages.
"False Discovery Rate", Retrieved From: https://en.wikipedia.org/wiki/False_discovery_rate, Retrieved On: Jan. 9, 2019, 9 Pages.
"Family-Wise Error Rate", Retrieved From: https://en.wikipedia.org/wiki/Family-wise_error_rate, Retrieved date: Jan. 9, 2019, 5 Pages.

(Continued)

*Primary Examiner* — Katherine Lin
(74) *Attorney, Agent, or Firm* — Nicholson De Vos Webster & Elliott, LLP (57) ABSTRACT

Technologies for monitoring performance of a machine learning model include receiving, by an unsupervised anomaly detection function, digital time series data for a feature metric; where the feature metric is computed for a feature that is extracted from an online system over a time interval; where the machine learning model is to produce model output that relates to one or more users' use of the online system; using the unsupervised anomaly detection function, detecting anomalies in the digital time series data; labeling a subset of the detected anomalies in response to a deviation of a time-series prediction model from a predicted baseline model exceeding a predicted deviation criterion; creating digital output that identifies the feature as associated with the labeled subset of the detected anomalies; causing, in response to the digital output, a modification of the machine learning model.

20 Claims, 5 Drawing Sheets

(56) References Cited

OTHER PUBLICATIONS

"Mean Reciprocal Rank", Retrieved From: https://en.wikipedia.org/wiki/Mean_reciprocal_rank, Retrieved On: Jan. 9, 2019, 2 Pages.
Genovese, Christopher R., "A Tutorial on False Discovery Control", In Talk at Hannover Workshop, Jan. 2004, 50 Pages.

* cited by examiner

MACHINE LEARNING MODEL MONITORING

TECHNICAL FIELD

The present disclosure relates to online systems and more particularly to technologies for monitoring machine learning models that generate predictive data used by online systems to make program execution decisions.

BACKGROUND

The quality of predictions output by machine learning models depends on the quality of the features used to train the model. Commercially available model monitoring products generate alerts but do not discriminate among the alerts. When a machine learning model uses a large number of features, these off the shelf products generate so many alerts that it is very challenging, if not impossible, for an online system or an analyst to determine which of the alerts are important. Consequently, whether the model needs remediation is hard to determine.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Online systems, such as professional or social connection networks, can use machine learning models to generate predictive data, such as scores, rankings, or probabilities. Predictive data produced by such models is used by the online systems to drive program execution. For example, an online system may use machine learning models to predict the likelihood that a particular type of user interaction will occur; for example, a view, comment or share of a particular content item in a news feed, or an acceptance of a connection request from another member of a connection network. Machine learning models can also be used by online systems to score and rank content items according to relevance, where relevance is predicted by the model based on historical user interaction data. The online system may use the model output to determine which items of content to display to a user and/or how to organize content items in a display.

In an online connection network, the member distribution changes over time. Consequently, the values of features used by machine learning models to make member-related predictions are dynamic. Dynamic feature values increase the risk of model degradation. Model degradation affects system performance. As a model degrades, predictions made by the online system become less accurate or out of date. Moreover, when a model bases its prediction on analysis of a large number of features, it becomes more difficult to identify those features that are the root cause of model performance issues.

Existing data monitoring tools rely on human-configured rules. Rule-based approaches quickly become unwieldy for machine learning models that consume large numbers of features. Rules need to be hand-coded with hard thresholds that are not easily adaptable to feature trends. Further, existing model monitoring tools do not correlate feature health with model stability.

Model performance issues typically do not surface until there is a noticeable impact on use of model-driven functionality, such as declining user interaction with news feeds, messaging, or recommendation functionality, or reductions in the volume of content posted to or interacted with through the online system.

This disclosure describes technologies that address these and other technological challenges. The disclosed technologies use an unsupervised approach to build statistical models of feature metrics. The statistical models are used to detect anomalies in the feature metrics. The unsupervised approach does not rely on rules, pre-determined labels, or hard thresholds. Rather, an unsupervised anomaly detection function proactively discovers anomalies through statistical analysis of time series data for the feature metrics.

The disclosed unsupervised anomaly detection function is a machine-learned model that is trained on feature statistics time series data. In an embodiment, the unsupervised anomaly detection function can automatically adjust itself as the feature statistics time series data changes over time. Examples of adjustments include changing model coefficients or weight values that are assigned to specific features and adding or removing features or feature values. In this way, the unsupervised anomaly detection function can adjust the predictions that it outputs without needing users to explicitly label the feature statistics.

Once a set of anomalies has been identified, the disclosed technologies can identify the most important anomalies and pinpoint the particular features that are the main contributors to model performance degradation. A reduction in the number of alerts produced by the monitoring system is one advantage of the disclosed approach.

Output of the disclosed anomaly detection function is converted to actionable output. For example, the output can be filtered, ranked, and summarized according to the needs of particular vertical applications. The online system or an analyst can act on the output to address feature health issues, perform model re-training, or retire the model entirely. The online system or an analyst can proactively detect and address poor or declining model performance by collecting and incorporating new training data. Such early detection addresses model performance issues before they surface to the end user in model-driven functionality of the online system.

Examples of actionable output include digital recommendations of best times to re-train the model and digital suggestions to use or not use certain training data within certain time periods, for example because the data is determined to be an outlier. Any one or more of these responses to model performance issues identified by the disclosed technologies may be used as alternatives or in addition to model-retraining or other techniques.

In these and other ways, the disclosed technologies can improve online machine learning model stability and performance. Experimental results have shown that the disclosed technologies have been able to accurately identify a root cause of a machine learning model's observed drop in performance while filtering out inconsequential anomalies in the feature metrics.

The disclosed technologies are not limited to the above features and advantages. Other features and advantages may be realized by any one or more embodiments of the disclosed technologies.

MODEL MONITORING PROCESS OVERVIEW

Figure 1:
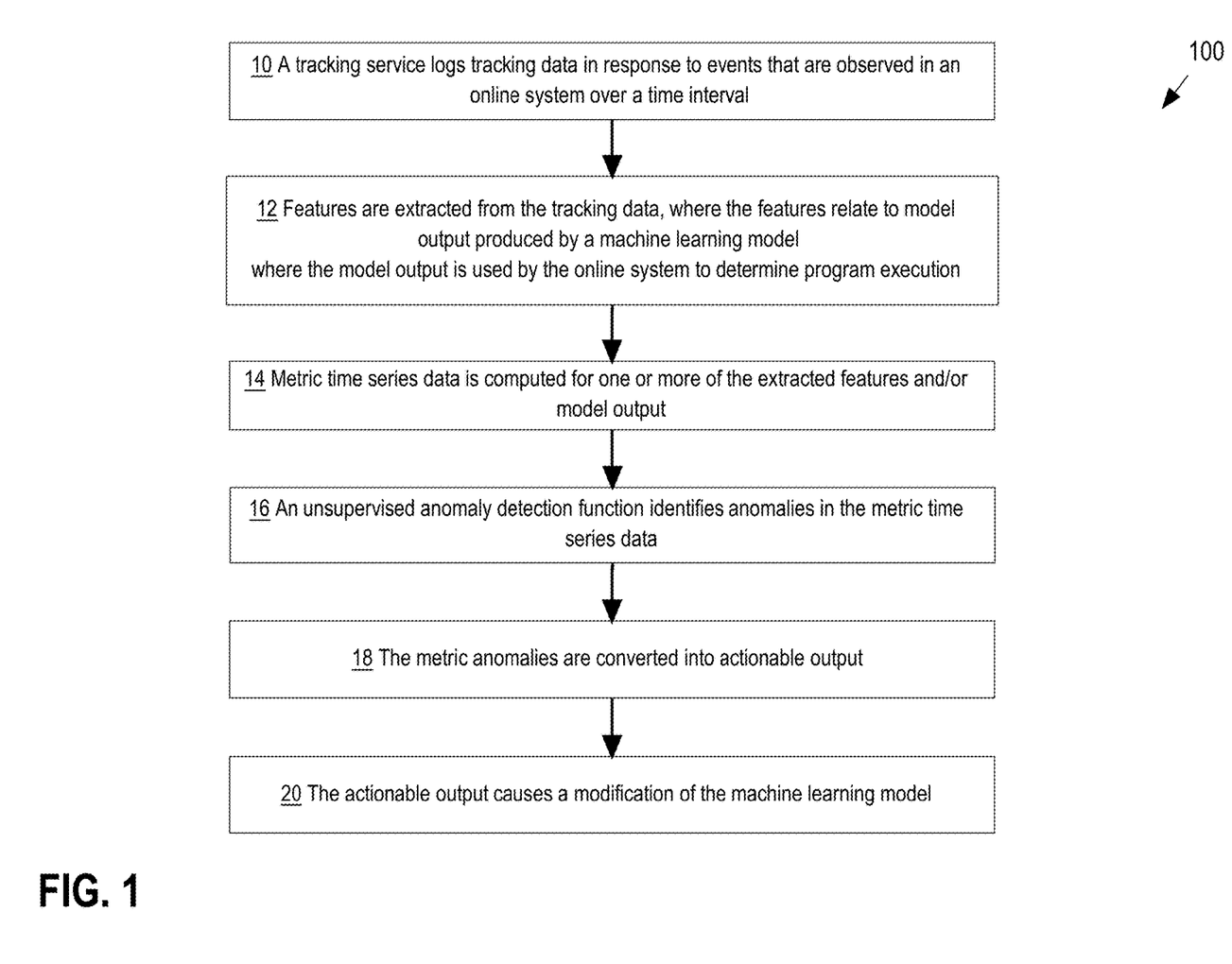
FIG. 1 is a flow diagram of a process, in an embodiment.

FIG. 1 is a flow diagram that depicts a process 100 that can be used by an online system to monitor performance of a machine learning model that is used by the online system to generate model output that includes predictive data, such as ranking scores and probabilities, in an embodiment. Portions of process 100 may be performed by a single entity or program or by multiple entities or programs, including for example a browser plug-in and a remote server.

The operations of the process as shown in FIG. 1 can be implemented using processor-executable instructions that are stored in computer memory. For purposes of providing a clear example, the operations of FIG. 1 are described as performed by computing device(s) 110, 140, which may be individually or collectively referred to as simply 'computing system 300.' In an embodiment, portions of process 100 may be implemented in one or more of the software components shown in FIG. 2, described below, which in turn may be embodied in one or more of the computing devices shown in FIG. 3, described below.

In operation 10, a tracking service of computing system 300 logs tracking data in response to events that are observed as having occurred during operation of an online system over a time interval. The time interval may be a daily time interval or a weekly time interval, for example.

In an embodiment, the online system manages operations performed by and interactions between nodes of a connection network. Nodes and interactions between nodes of the connection network may be implemented using a connection graph. For instance, a node may store profile data and/or activity data that is associated with one or more entities that use the online system. Edges connecting two nodes in the connection graph may represent relationships between the connected nodes. An edge may store data that is associated with the relationship between the connected nodes.

Examples of events that may be observed by the tracking service include entity interactions with nodes and/or content items. Examples of entity interactions with nodes include sending and receiving electronic connection requests and messages. Examples of entity interactions with content items include viewing, sharing, or commenting on particular content items. Thus, in an embodiment, tracking data identifies, for a tracked event, node(s) and/or content item(s) involved in the event as well as the associated online interaction(s). Examples of online interactions include as mouse clicks, taps, scrolls, swipes, and other interactions with a user interface. Tracking data may include labels that characterize the online interactions. Examples of labels are text descriptions such as "view," "share," "connect," "decline," "comment."

In operation 12, features are extracted from the tracking data, where the features relate to model output that includes predictions or scores that are produced by a machine learning model and used by the online system to determine program execution. For example, the online system may use the model output to determine how to organize a particular set of output to be displayed to a user.

The features extracted from the tracking data represent user interactions that occur in response to the online system's program execution decisions, for example, presentations of output, which have been configured in accordance with the machine learning model output. For example, the model output may include a probability that a user will click on a particular content item within a given time interval. The features extracted from the tracking data may include interaction data that indicates whether the user actually clicked on the particular content item in the time interval of operation 10.

Similarly, the model output may include a ranking score that ranks a particular content item as being more or less of interest to a particular user, in relation to other content items. The online system uses the ranking score to present the content item more or less prominently than other content items on a display screen. The features extracted from the tracking data may include interaction data that indicates the user's level or type of interaction with the content item. As these examples show, a comparison of features extracted from the tracking data to previously computed model output can be used to evaluate the model's performance.

Examples of types of machine learning models that can be used to generate the model output include but are not limited to probabilistic models, tree-based models, ensemble models, and rule-based optimization models.

Features extracted from tracking data produced by the tracking service include numeric features and categorical features. An example of a numeric feature is the number of first-degree connections that a node has in the connection graph. An example of a categorical feature is a particular classification of interaction data, such as view, comment or share.

Features extracted from tracking data can come from many different data sources, including multiple different vertical applications. Application-side features are features that are specific to a particular vertical application. Source-side feature are features that are shared across models or used by more than one vertical application.

An extracted feature can have several dimensions that are included in the tracking data, for example, metadata associated with the feature. Examples of feature dimensions that may be included in the tracking data include model unit, model identifier, activity type, use cases, user segment, query tagging position. The set of feature dimensions used in a given implementation of the disclosed technologies may be determined based on the particular vertical application using the model for which performance is being monitored.

Metric Computation

In operation 14, metric time series data is computed for one or more of the features that are extracted from tracking data in operation 12 and/or model output. Model output may be obtained by operation 14 from the online system, from the tracking service, or directly from the machine learning model. In various embodiments, model output is used by the online system to configure any one or more of the following:

a content recommendation, a connection recommendation, a job opportunity recommendation, a search query.

In an embodiment, time series data is computed for each metric. The time series data for a particular metric includes data values that are computed by applying mathematical techniques to the features and/or model output, as the case may be, where the time series data corresponds to the time interval of operation 10.

In an embodiment, multiple different types of metrics are computed in operation 14, including any or more of the following: model stability metrics, label data metrics, and feature statistics. Model stability metrics can be used to monitor model prediction bias and/or ranking quality. The type of model stability metric used can depend on the type of model output being monitored. For example, when the model output is a prediction, an observed/estimated (O/E) ratio may be used as the model stability metric. When the model output comprises a score, a normalized discounted cumulative gain (NDCG) or a mean reciprocal rank (MRR) may be used as the model stability metric.

Label data metrics can be used in conjunction with model stability metrics to understand users' activity in the online system. Examples of label data metrics include action metrics, such as clicks and viral actions.

Feature statistics are used to monitor the quality of features that are used by the machine learning model to generate predictive data. For example, feature distributions can be monitored to determine which data source(s) may contain or be the cause of low quality features. In an embodiment, feature statistics are correlated with model stability metrics in order to provide root cause explanations of anomalies in the model stability metrics.

Multiple different feature statistics may be computed for any given feature. The metrics that are computed for a given feature may vary depending on the feature type. For example, when a feature is a numeric feature, the feature statistics computed for the numeric feature may include any one or more of the following: a feature value mean, a feature quantile. When the feature is a categorical feature, the feature statistics computed for the categorical feature may include any one or more of the following: a feature count, a feature count ratio.

Anomaly Detection

In operation 16, an unsupervised anomaly detection function identifies a set of anomalies in the metric time series data. The unsupervised anomaly detection function receives the digital time series data, which is output by operation 14, for a given metric, and uses statistical analysis techniques to identify the set of anomalies.

Figure 4:
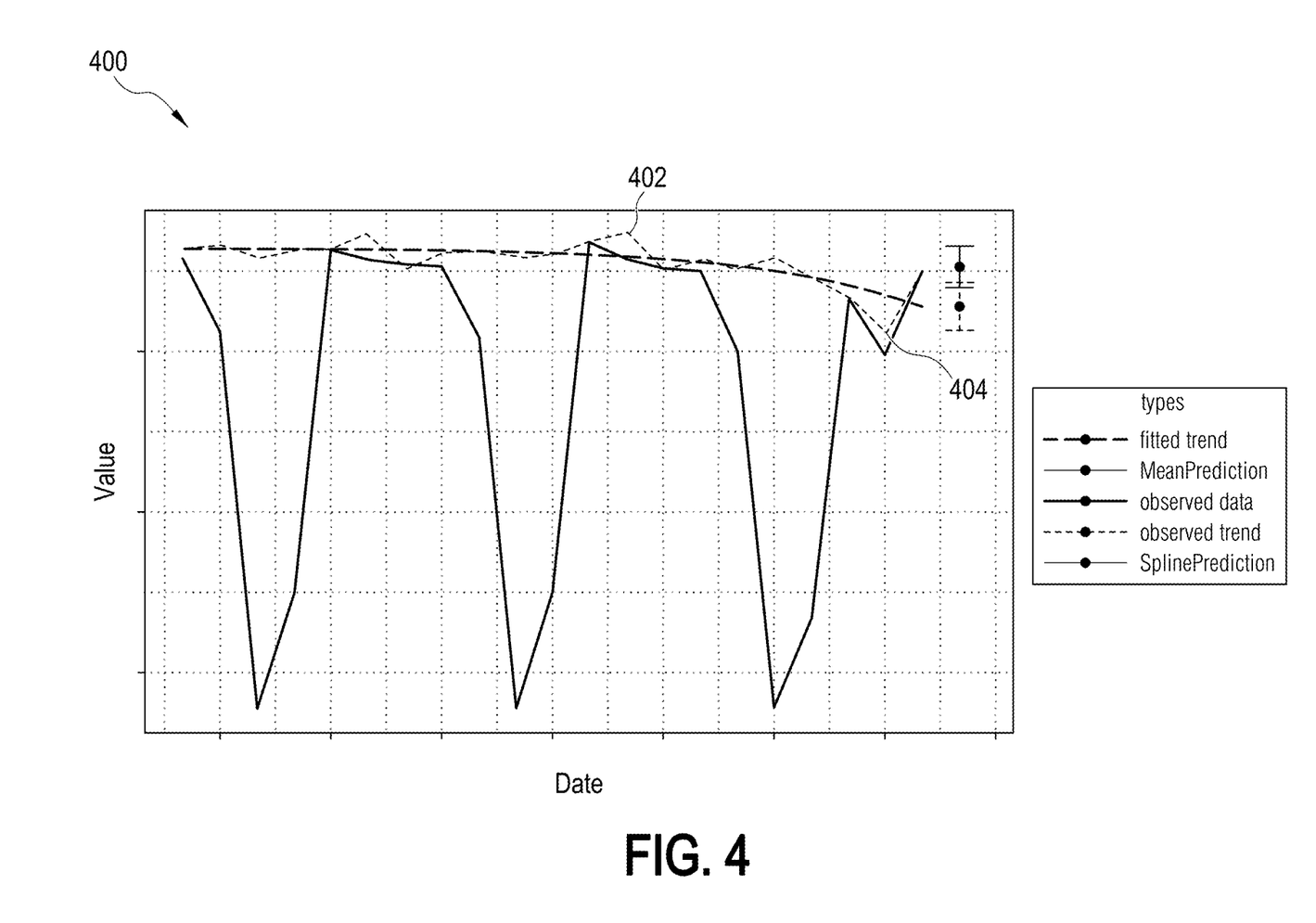
FIG. 4 is a plot of example feature metric time series data, in an embodiment.

In an embodiment, a subset of the anomalies detected in a given metric time series is labeled when a time-series prediction model of the metric time series data deviates from a predicted baseline model by an amount that exceeds a predicted deviation criterion. In an embodiment, anomalies in a model stability metric are detected by comparing model output to ground truth data, where the ground truth data may be obtained from the tracking service or directly from the online system. An example plot that shows a time-series prediction model, a predicted baseline model and a predicted deviation criterion is shown in FIG. 4, described below.

In an embodiment, a group-level filter or hypothesis testing is used by operation 16 to determine whether to label an anomaly that is detected by the unsupervised anomaly detection function in feature statistics. That is, operation 16 may label only a subset of all of the anomalies that are detected in a feature statistic, and may use group-level filtering or hypothesis testing to filter out insignificant anomalies.

A group-level filter can be used to filter insignificant anomalies, which may be caused by multi-hypothesis testing. Multi-hypothesis testing may result from the use of hypothesis testing on a large number of feature statistics. Hypothesis testing can be used to determine if a detected anomaly is significant. In an embodiment, a hypothesis test $H_0$ is $$H_0: y_{t,f_s,u}(\text{observed}) = y_{t,f_s,u}(\text{expected})$$

and is used to determine whether a value y at time t on feature statistics $f_s$ and use case u is an anomaly. False alarms can be reduced at a group level, by computing the probability of making at least one false alarm, across all feature statistics and use cases, using:

$$P(\text{reflect at least one true } H_0) = 1 - P(\text{no significant results}) = 1 - (1-a)^{\# f_{sx} \# u}$$

Where P is the probability and alpha is the significance level. Other statistical methods used to control and reduce false alarms include False Discovery Rate (FDR), the expected proportion of false discoveries within the multi-hypothesis testing, Family Wise Error Rate (FWER), and the Benjamin-Hochbeg (BH) method. In experiment results, the group-level filter has been able to filter out 90% of insignificant anomalies in the feature statistics while keeping the most problematic features in the alert reports.

In an embodiment, the unsupervised anomaly detection function automatically adjusts the predicted baseline model in response to changes in the digital time series data for the feature statistic. When metric time series data contains fluctuations, the unsupervised anomaly detection function determines whether the fluctuations should be disregarded or whether they evidence a new trend that should be incorporated into the baseline model.

To do this, in an embodiment, the unsupervised anomaly detection function determines whether the metric time series data follows a Gaussian distribution. In another embodiment, the unsupervised anomaly detection function determines whether the metric time series data has periodic seasonality, for example weekly seasonality. For feature statistics time series data, new trends can be detected based on long-term feature shifts. The detection of a new trend can cause the system to adjust the baseline model and can result in the system suggesting or automatically causing re-training of the machine learning model.

Creation of Actionable Output

In operation 18, the metric anomalies identified and labeled in operation 16 are converted into feature-specific actionable output. To do this, in an embodiment, the metric anomalies are filtered, ranked, and summarized using a rule set that may include generalized rules that apply to more than one vertical application and/or specific rules that apply to one or more specific vertical applications. In an embodiment, the rule set includes user-defined rules that are used to rank features that are associated with labeled anomalies.

In an embodiment, operation 18 creates the actionable output in response to a co-occurrence of anomalies in time series data for the model stability metric and time series data for the feature statistics. By looking for and identifying such co-occurrences, the system is able to reduce the amount of actionable output that is produced by limiting alerts to occasions in which such co-occurrences are present.

The actionable output produced by operation 18 includes digital output that identifies particular features as being associated with labeled anomalies. That is, the actionable output can identify specific features that are associated with particular anomalies and which are thus the root causes of particular model performance issues that are evidenced by the anomalies. At the same time, metric anomalies that the system determines to be less significant may be excluded from the actionable output or de-emphasized in the actionable output. The actionable output may include a daily alert report or a weekly alert report, for example.

In operation 20, the actionable output causes a modification of the machine learning model. In an embodiment, the actionable output is presented to an analyst through a graphical user interface and the analyst performs model modifications through the graphical user interface. In another embodiment, the system performs model modifications autonomously.

Examples of ways in which operation 20 may cause model modifications include causing any one or more of the following: sending an electronic notification that contains the digital output, displaying the digital output on a display device, using the digital output to re-train the machine learning model, using the digital output to debug the machine learning model, using the actionable output to add features to or remove features from the machine learning model, using the actionable output to adjust coefficients of the machine learning model.

Example Arrangement of Software Components for Model Monitoring

Figure 2:
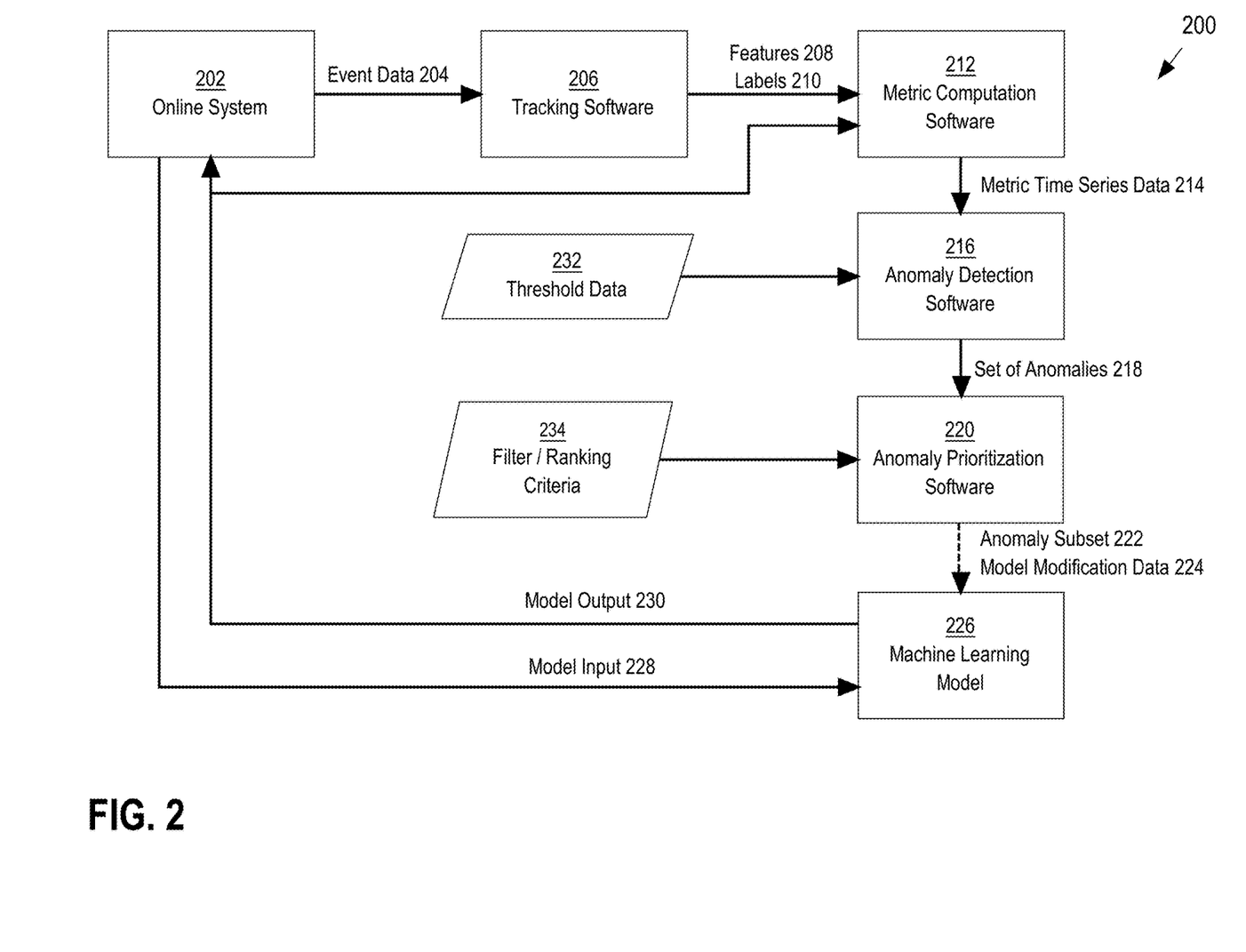
FIG. 2 is a block diagram of a software-based system, in an embodiment.

FIG. 2 is a block diagram that depicts an example system 200 for monitoring machine learning model performance, in an embodiment. The software-based and data components of the system of FIG. 2 include online system 202, event data 204, tracking software 206, features 208, labels 210, metric computation software 212, metric time series data 214, anomaly detection software 216, set of anomalies 218, anomaly prioritization software 220, anomaly subset 222, model modification data 224, machine learning model 226, model input 228, model output 230. Portions of these components are encoded as computer-readable instructions using a programming language such as Python. Portions of these components may be implemented using commercially available software products, including open source software.

Figure 3:
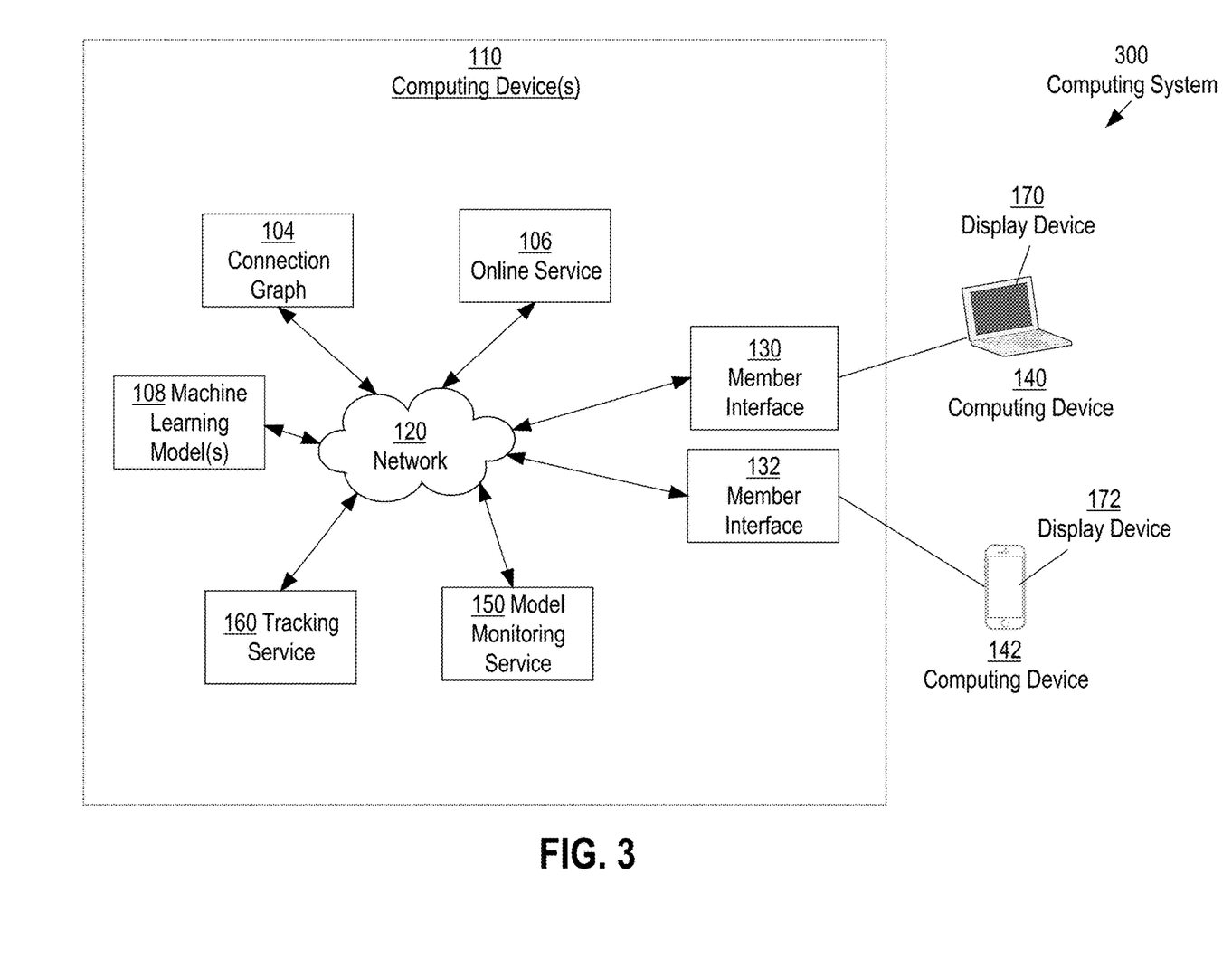
FIG. 3 is a block diagram of a networked computing environment, in an embodiment.

As shown in FIG. 2, tracking software 206 extracts event data 204 from online system 202 over a time interval. Online system 202 may be implemented as part of online service 106 using connection graph 104 as shown in FIG. 3, described below. Tracking software 206 may be implemented as part of tracking service 160 shown in FIG. 3 and may be programmed to operations 10 and/or 12 of FIG. 1, described above.

In an embodiment, tracking software 206 logs event data 204 and extracts features 208 and labels 210 from event data 204 using SAMZA (open-source software for near-realtime, asynchronous stream processing, provided by the Apache Software Foundation). In an embodiment, features 208 and labels 210 are output for use by metric computation software 212 using KAFKA (open-source software for building real-time data pipelines, provided by the Apache Software Foundation). Other software products providing similar or equivalent functionality as the software products mentioned in this disclosure are used in other embodiments.

Machine learning model 226 is the model whose performance is being monitored. Machine learning model 226 is typically trained offline by applying a machine learning algorithm to a training data set of features 208 and labels 210. Once trained, machine learning model 226 produces model output 230 in response to model input 228, where model input 228 includes instances of features 208 and labels 210 that are produced during live operation of online system 202.

Model output 230 is used during live operation of online system 202 to influence program execution decisions made by online system 202. Thus, when the disclosed technologies are used to monitor, maintain, or improve the performance of machine learning model 226, the improvements to model 226 in turn improve the program execution decision made by online system 202. Machine learning model 226 may be implemented as part of machine learning model(s) 108, shown in FIG. 3, described below.

Metric computation software 212 computes the metric time series data using as input features 208 and labels 210, as described above. In an embodiment, metric computation software 212 is programmed to perform operation 14 of FIG. 1, described above. Metric computation software 212 outputs metric time series data 214 for use by anomaly detection software 216.

Anomaly detection software 216 detects anomalies in metric time series data 214 using the disclosed unsupervised techniques and threshold data 232. Threshold data 232 includes one or more criteria, such as minimum values, maximum values, and ranges, that are used by anomaly detection software 216 to identify anomalies in the metric time series data 214 and distinguish anomalies from expected or normal model performance. In an embodiment, anomaly detection software 216 is programmed to perform operation 16 of FIG. 1, described above. Anomaly detection software 216 outputs a set of anomalies 218 for use by anomaly prioritization software 220. Anomaly detection software 216 outputs a set of anomalies 218 for use by anomaly prioritization software 220.

Anomaly prioritization software 220 determines a subset 222 of the set of anomalies 218 for which actionable output should be produced. In doing so, anomaly prioritization software 220 may be programmed to perform operation 18 of FIG. 1, described above. Anomaly prioritization software 220 uses filter/ranking criteria 234 to distinguish significant anomalies from insignificant anomalies as discussed above. Filter/ranking criteria 234 may include, for example, rule sets for ranking anomalies and/or coefficients used by group-level filtering. Anomaly prioritization software 220 outputs anomaly subset 222 and model modification data 224. Model modification data may include, for example, recommended model modifications. The anomaly subset 22 and/or model modification data 224 may be presented to an analyst via a user interface or incorporated directly into machine learning model 226 using an automated tool.

Portions of metric computation software 212, anomaly detection software 216, and anomaly prioritization software 220 may be implemented in model monitoring service 150, shown in FIG. 3, described below.

Example Networked System Environment

FIG. 3 is a block diagram that depicts an example computing system 300 arranged to operate a model monitoring service 150, a tracking service 160, member interfaces 130, 132, and to leverage information obtained from an online service 106, connection graph 104 and a machine learning model 108, in an embodiment. Computing system 300 includes computing device(s) 110, computing devices 140, 142, and display devices 170, 172, which are communicatively coupled to an electronic communications network 120.

Implemented in the devices 110, 140, 142, 170, 172 using computer software, hardware, or software and hardware, are processor-executable instructions, data structures, and digital data, stored in memory, which cooperate to provide the computer-implemented functionality described herein. For ease of discussion, these computer-implemented components are represented schematically in FIG. 3 as online service 106, connection graph 104, machine learning model(s) 108, member interface 130, member interface 132, model monitoring service 150, tracking service 160.

"System" as used herein may refer to a single computer or network of computers and/or other devices. "Computing device" as used herein may refer to a computer or any other electronic device that is equipped with a processor. Although computing system 300 may be implemented with any number of online service 106, connection graph 104, machine learning model(s) 108, member interface 130, member interface 132, model monitoring service 150, tracking service 160, computing device(s) 110, display devices 170, 172 and computing devices 140, 142, respectively, in this disclosure, these elements may be referred to in the singular form for ease of discussion.

Online service 106, connection graph 104, machine learning model 108, member interface 130, member interface 132, model monitoring service 150, tracking service 160 are shown as separate elements in FIG. 3 for ease of discussion but the illustration is not meant to imply that separation of these elements is required. The illustrated systems (or their functionality) and data stores may be divided over any number of physical systems, including a single physical computer system, and can communicate with each other in any appropriate manner.

Member interfaces 130, 132 may be implemented using a Web server computer that communicates with Web browser software running on computing devices 140, 142. Member interfaces 130, 132 enable access to different portions of the functionality of computing system 300, by computing devices 140, 142. For example, web pages containing data of online service 106 may be presented to entities via member interfaces 130, 132 using web browser software. Electronic notifications produced by model monitoring services of computing system 300 may be presented to entities using computing devices 140, 142 via member interfaces 130, 132.

Portions of online service 106, connection graph 104, machine learning model 108, member interface 130, member interface 132, model monitoring service 150, tracking service 160 may be implemented as web-based software applications and hosted by a hosting service (not shown). For example, member interfaces 130, 132, and portions of online service 106, connection graph 104, machine learning model 108, model monitoring service 150, tracking service 160 may be implemented as client-side and server-side portions, respectively, of a connection network service such as the LINKEDIN software, which is commercially available from LinkedIn Corporation of Sunnyvale, Calif. In an embodiment, portions of each of member interface 130 and member interface 132 are implemented in a web browser that can execute on computing devices 140, 142, respectively.

In some embodiments, each of computing devices 140, 142 is a client-side computing device or set of cooperating computing devices, such as a smart phone, tablet computer, wearable or body-mounted device, smart appliance, laptop machine, or combination of any of such devices, and computing device 110 is a server-side computing device such as a server computer or network of server computers accessible by the Internet, for example in a public or private cloud. As illustrated in FIG. 3, each of display devices 170, 172 is implemented in a computing device 140, 142, respectively, but may be implemented as a separate device or as part of another device, or as multiple networked display devices, in other implementations.

Online service 106 is a computer-implemented networking service for entities, such as a professional networking service or an online social network. Online service 106 contains nodes that represent the entities using the online service 106. Data associated with nodes and connections between nodes are represented using connection graph 104. In the context of online service 106, "node" may refer to a software abstraction of entity data and need not be tied to any particular hardware or machine that is connected to network 120.

Some implementations of online service 106 allow entities (via users operating electronic devices) to register with online service 106 (thereby creating a node on online service 106), create entity data (for example, profile data), establish connections with other registered entities, and perform other actions, such as message other entities, post articles, view postings from other entities, comment on postings, "like" postings, endorse other entities or established connections, etc. An entity profile may include, for example, a name of the entity, a job title, a job industry, academic institutions attended, employment status, previous and current employers, skills, endorsements from other entities, contact information, address information.

Machine learning model(s) 108 include one or more models whose performance may be monitored using the disclosed technologies. Machine learning model(s) 108 may be implemented as a single model or a model cluster. Machine learning model(s) 108 may be implemented as a network service that is part of online service 106 or which is separate from online service 106.

Model monitoring service 150 uses the disclosed technologies to monitor one or more of machine learning model(s) 108. Model monitoring service 150 may be implemented as a network service that is part of online service 106 or which is separate from online service 106. As such, model monitoring service 150 is capable of monitoring performance of individual vertical application models or conducting model performance monitoring horizontally across multiple different vertical application models.

Tracking service 160 processes real-time or near-realtime feeds of data that it receives from online service 106. In an embodiment, tracking service 160 outputs data on a stream messaging platform.

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142.

Computing devices 140, 142 operate member interfaces 130, 132 to establish logical connection(s) over network 120 with portions of online service 106 and may establish logical connection(s) over network 120 with model monitoring service 150, and/or tracking service 160.

Example Time-Series Prediction Model

FIG. 4 is a plot 400 of example metric time series data, including one example implementation of predicted baselines and observed trends, which can be used to detect and label anomalies that affect machine learning model performance, in an embodiment. In plot 400, the disclosed unsupervised anomaly detection function has been used to detect metric anomalies on daily-level metrics including model stability metrics and feature distributions. FIG. 4 and its accompanying description is provided to illustrate the above-described techniques and does not limit the scope of this disclosure.

In the example of FIG. 4, anomalies in time series metric data are detected by using statistics to generate a time-series prediction model, or trend model, of the time series data. Plot 400 illustrates predicted baselines using the above-described trend modes, where points 402 and 404 are identified as anomalies.

In plot 400, a time-series prediction model is fit to the observed time series data to predict values in a time interval. Hypothesis testing is conducted to determine if a deviation is an anomaly. In an embodiment, a "Generic Spline" method is used to build a time-series spline regression model that performs robustly on stable metrics and is also flexible enough to adapt to local trends on fluctuating metrics. T-statistics are then used to identify deviations from the time-series regression model.

The time-series prediction model is created for the metric using $f(t)=N(m(t),e(t))$, where N is Normal distribution, $m(t)$ is metric mean over time and $e(t)$ is metric variance over time. To formulate the model structure, the predicted mean is $m(t)=T(t)+S(t)$, where $T(t)$ is trend and $S(t)$ is seasonality. Seasonality $S(t)$ is estimated by fitting $y(t)=S(t)+BSpline$, where $y(t)$ is the time-series for training, BSpline is a natural cubic spline with no inner knots. Trend $T(t)$ is determined separately based on the metric type.

The predicted variance is $Var(\hat{y}(t))=Var(T(t))+Var(S(t))+Cov(T(t),S(t))$ plus a noise factor. A deviance $\epsilon(t)=y(t)-f(t)$ is determined to be an anomaly if $H_0$: $\epsilon(t)=0$ is rejected.

To estimate the trend component $T(t)$ for model stability metrics, a non-parametric way to model $T(t)$ is used, where a predicted value of $T(t)$ is $\hat{T}(t)=E[y(t)-S(t)]$, which is estimated using a mean value of $[y(t)-S(t)]$ for t in a training period. Predicted variance of $T(t)$ is $Var(E[y(t)-S(t)])$, which is estimated by variance of the above mean value for t in the training period. Covariance between $T(t),S(t)$ is not computed within this mode.

For features statistics, anomalies are detected based on an aggressive trend fit. In an embodiment, a predicted value of $T(t)=Last\_TrainPoint(B-Spline$ to capture the most recent trend. Predicted variance of $T(t)$ is the variance from Spline Basis. Covariance between $T(t),S(t)$ is estimated using a design matrix given the initial model.

Implementation Example—Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
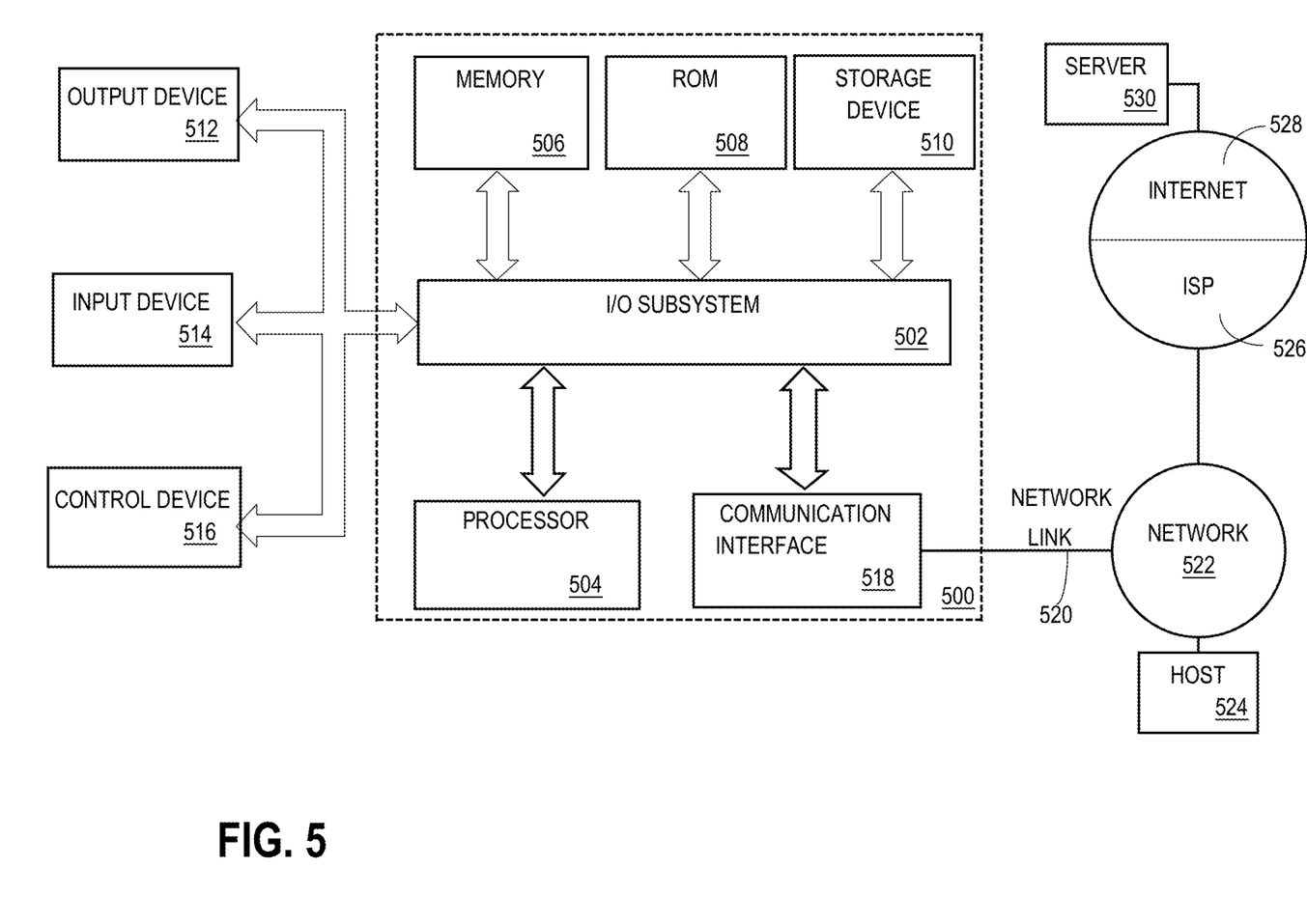
FIG. 5 is a block diagram that illustrates a hardware environment upon which an embodiment of the invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples described below.

In an example 1, a method for monitoring performance of a machine learning model includes receiving, by an unsupervised anomaly detection function, digital time series data for a feature metric; wherein the feature metric is computed for a feature that is extracted from an online system over a time interval; wherein the machine learning model is to produce model output that relates to one or more users' use of the online system; using the unsupervised anomaly detection function, detecting anomalies in the digital time series data; labeling a subset of the detected anomalies in response to a deviation of a time-series prediction model from a predicted baseline model exceeding a predicted deviation criterion; creating digital output that identifies the feature as associated with the labeled subset of the detected anomalies; causing, in response to the digital output, a modification of the machine learning model; wherein the method is performed by one or more computing devices.

An example 2 includes the subject matter of example 1, comprising causing, in response to the digital output, any one or more of the following: sending an electronic notification that contains the digital output, displaying the digital output on a display device, using the digital output to re-train the machine learning model, using the digital output to debug the machine learning model. An example 3 includes the subject matter of example 1 or example 2, wherein the time interval comprises a daily time interval or a weekly time interval and the method comprises generating a daily report or a weekly report of the digital output. An example 4 includes the subject matter of any of examples 1-3, comprising: receiving, by the unsupervised anomaly detection function, digital time series data for a model stability metric; wherein the model stability metric is computed by comparing output of the machine learning model to ground truth data over a time interval; using the unsupervised anomaly detection function, detecting anomalies in the digital time series data for the model stability metric; labeling a subset of the detected anomalies in the digital time series data for the model stability metric; creating the digital output in response to a co-occurrence of the subset of the detected anomalies in the digital time series data for the model stability metric and the subset of the detected anomalies in the digital time series data for the feature metric. An example 5 includes the subject matter of any of examples 1-4, wherein the unsupervised anomaly detection function automatically adjusts the predicted baseline model in response to changes in the digital time series data for the feature metric. An example 6 includes the subject matter of any of examples 1-5, wherein the unsupervised anomaly detection function uses group-level filtering or hypothesis testing to determine whether to label an anomaly detected by the unsupervised anomaly detection function. An example 7 includes the subject matter of any of examples 1-6, comprising using a set of user-definable rules to rank the feature in relation to other features that are associated with other labeled anomalies. An example 8 includes the subject matter of any of examples 1-7, wherein when the feature is a numeric feature, the feature metric comprises any one or more of the following: a feature value mean, a feature quantile, and when the feature is a categorical feature, the feature metric comprises any one or more of the following: a feature count, a feature count ratio. An example 9 includes the subject matter of example 4, wherein when the model output comprises a prediction, the model stability metric comprises an observed/estimated (O/E) ratio, and when the model output comprises a score, the model stability metric comprises a normalized discounted cumulative gain (NDCG) or a mean reciprocal rank (MRR). An example 10 includes the subject matter of any of examples 1-9, wherein the model output is used by the online system to configure any one or more of the following: a content recommendation, a connection recommendation, a job opportunity recommendation, a search query.

In an example 11, a computer program product includes one or more non-transitory computer-readable storage media comprising instructions which, when executed by one or more processors, cause the one or more processors to perform operations comprising: receiving, by an unsupervised anomaly detection function, digital time series data for a feature metric; wherein the feature metric is computed for a feature that is extracted from an online system over a time interval; wherein a machine learning model is to produce model output that relates to one or more users' use of the online system; using the unsupervised anomaly detection function, detecting anomalies in the digital time series data; labeling a subset of the detected anomalies in response to a deviation of a time-series prediction model from a predicted baseline model exceeding a predicted deviation criterion; creating digital output that identifies the feature as associated with the labeled subset of the detected anomalies; causing, in response to the digital output, a modification of the machine learning model.

An example 12 includes the subject matter of example 11, wherein the instructions, when executed by one or more processors, cause the one or more processors to perform operations comprising causing, in response to the digital output, any one or more of the following: sending an electronic notification that contains the digital output, displaying the digital output on a display device, using the digital output to re-train the machine learning model, using the digital output to debug the machine learning model. An example 13 includes the subject matter of example 11 or example 12, wherein the time interval comprises a daily time interval or a weekly time interval and the instructions, when executed by one or more processors, cause the one or more processors to perform operations comprising generating a daily report or a weekly report of the digital output. An example 14 includes the subject matter of any of examples 11-13, wherein the instructions, when executed by one or more processors, cause the one or more processors to perform operations comprising: receiving, by the unsupervised anomaly detection function, digital time series data for a model stability metric; wherein the model stability metric is computed by comparing output of the machine learning model to ground truth data over a time interval; using the unsupervised anomaly detection function, detecting anomalies in the digital time series data for the model stability metric; labeling a subset of the detected anomalies in the digital time series data for the model stability metric; creating the digital output in response to a co-occurrence of the subset of the detected anomalies in the digital time series data for the model stability metric and the subset of the detected anomalies in the digital time series data for the feature metric. An example 15 includes the subject matter of any of examples 11-14, wherein the unsupervised anomaly detection function automatically adjusts the predicted baseline model in response to changes in the digital time series data for the feature metric. An example 16 includes the subject matter of any of examples 11-15, wherein the unsupervised anomaly detection function uses group-level filtering or hypothesis testing to determine whether to label an anomaly detected by the unsupervised anomaly detection function. An example 17 includes the subject matter of any of examples 11-16, wherein the instructions, when executed by one or more processors, cause the one or more processors to perform operations comprising using a set of user-definable rules to rank the feature in relation to other features that are associated with other labeled anomalies. An example 18 includes the subject matter of any of examples 11-17, wherein when the feature is a numeric feature, the feature metric comprises any one or more of the following: a feature value mean, a feature quantile, and when the feature is a categorical feature, the feature metric comprises any one or more of the following: a feature count, a feature count ratio. An example 19 includes the subject matter of example 14, wherein when the model output comprises a prediction, the model stability metric comprises an observed/estimated (O/E) ratio, and when the model output comprises a score, the model stability metric comprises a normalized discounted cumulative gain (NDCG) or a mean reciprocal rank (MRR). An example 20 includes the subject matter of any of examples 11-19, wherein the model output is used by the online system to configure any one or more of the following: a content recommendation, a connection recommendation, a job opportunity recommendation, a search query.

GENERAL CONSIDERATIONS

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for monitoring performance of a machine learning model, the method comprising:
   receiving, by an unsupervised anomaly detection function, digital time series data for a feature metric;
   wherein the feature metric is computed for a feature that is extracted from an online system over a time interval;
   wherein the feature represents one or more user interactions responsive to one or more program execution decisions of the online system;
   wherein the machine learning model is to produce model output that relates to one or more users' use of the online system;
   using the unsupervised anomaly detection function, detecting anomalies in the digital time series data;
   labeling a subset of the detected anomalies in response to a deviation of a time-series prediction model from a predicted baseline model exceeding a predicted deviation criterion;
   creating digital output that identifies the feature as associated with the labeled subset of the detected anomalies; and
   causing, in response to the digital output, a modification of the machine learning model,
   wherein the method is performed by one or more computing devices.

2. The method of claim 1, comprising causing, in response to the digital output, any one or more of the following: sending an electronic notification that contains the digital output, displaying the digital output on a display device, using the digital output to re- train the machine learning model, using the digital output to debug the machine learning model.

3. The method of claim 1, wherein the time interval comprises a daily time interval or a weekly time interval and the method comprises generating a daily report or a weekly report of the digital output.

4. A method for monitoring performance of a machine learning model, the method comprising:
   receiving, by an unsupervised anomaly detection function, digital time series data for a feature metric;
   wherein the feature metric is computed for a feature that is extracted from an online system over a time interval;
   wherein the machine learning model is to produce model output that relates to one or more users' use of the online system;
   using the unsupervised anomaly detection function, detecting anomalies in the digital time series data;

labeling a subset of the detected anomalies in response to a deviation of a time-series prediction model from a predicted baseline model exceeding a predicted deviation criterion;

creating digital output that identifies the feature as associated with the labeled subset of the detected anomalies;

causing, in response to the digital output, a modification of the machine learning model;

receiving, by the unsupervised anomaly detection function, digital time series data for a model stability metric;

wherein the model stability metric is computed by comparing output of the machine learning model to ground truth data over a time interval;

using the unsupervised anomaly detection function, detecting anomalies in the digital time series data for the model stability metric;

labeling a subset of the detected anomalies in the digital time series data for the model stability metric; and creating the digital output in response to a co-occurrence of the subset of the detected anomalies in the digital time series data for the model stability metric and the subset of the detected anomalies in the digital time series data for the feature metric, wherein the method is performed by one or more computing devices.

5. The method of claim 1, wherein the unsupervised anomaly detection function automatically adjusts the predicted baseline model in response to changes in the digital time series data for the feature metric.

6. The method of claim 1, wherein the unsupervised anomaly detection function uses group-level filtering or hypothesis testing to determine whether to label an anomaly detected by the unsupervised anomaly detection function.

7. The method of claim 1, comprising using a set of user-definable rules to rank the feature in relation to other features that are associated with other labeled anomalies.

8. The method of claim 1, wherein when the feature is a numeric feature, the feature metric comprises any one or more of the following: a feature value mean, a feature quantile, and when the feature is a categorical feature, the feature metric comprises any one or more of the following: a feature count, a feature count ratio.

9. The method of claim 4, wherein when the model output comprises a prediction, the model stability metric comprises an observed/estimated (O/E) ratio, and when the model output comprises a score, the model stability metric comprises a normalized discounted cumulative gain (NDCG) or a mean reciprocal rank (MRR).

10. The method of claim 1, wherein the model output is used by the online system to configure any one or more of the following: a content recommendation, a connection recommendation, a job opportunity recommendation, a search query.

11. A computer program product comprising one or more non-transitory computer-readable storage media comprising instructions which, when executed by one or more processors, cause the one or more processors to perform operations comprising:

receiving, by an unsupervised anomaly detection function, digital time series data for a feature metric;

wherein the feature metric is computed for a feature that is extracted from an online system over a time interval;

wherein the feature represents one or more user interactions responsive to one or more program execution decisions of the online system;

wherein a machine learning model is to produce model output that relates to one or more users' use of the online system;

using the unsupervised anomaly detection function, detecting anomalies in the digital time series data;

labeling a subset of the detected anomalies in response to a deviation of a time-series prediction model from a predicted baseline model exceeding a predicted deviation criterion;

creating digital output that identifies the feature as associated with the labeled subset of the detected anomalies; and causing, in response to the digital output, a modification of the machine learning model.

12. The computer program product of claim 11, wherein the instructions, when executed by one or more processors, cause the one or more processors to perform operations comprising causing, in response to the digital output, any one or more of the following: sending an electronic notification that contains the digital output, displaying the digital output on a display device, using the digital output to re-train the machine learning model, using the digital output to debug the machine learning model.

13. The computer program product of claim 11, wherein the time interval comprises a daily time interval or a weekly time interval and the instructions, when executed by one or more processors, cause the one or more processors to perform operations comprising generating a daily report or a weekly report of the digital output.

14. A computer program product comprising one or more non-transitory computer-readable storage media comprising instructions which, when executed by one or more processors, cause the one or more processors to perform operations comprising:

receiving, by an unsupervised anomaly detection function, digital time series data for a feature metric;

wherein the feature metric is computed for a feature that is extracted from an online system over a time interval;

wherein a machine learning model is to produce model output that relates to one or more users' use of the online system;

using the unsupervised anomaly detection function, detecting anomalies in the digital time series data;

labeling a subset of the detected anomalies in response to a deviation of a time-series prediction model from a predicted baseline model exceeding a predicted deviation criterion;

creating digital output that identifies the feature as associated with the labeled subset of the detected anomalies;

causing, in response to the digital output, a modification of the machine learning model;

receiving, by the unsupervised anomaly detection function, digital time series data for a model stability metric;

wherein the model stability metric is computed by comparing output of the machine learning model to ground truth data over a time interval;

using the unsupervised anomaly detection function, detecting anomalies in the digital time series data for the model stability metric;

labeling a subset of the detected anomalies in the digital time series data for the model stability metric; and creating the digital output in response to a co-occurrence of the subset of the detected anomalies in the digital time series data for the model stability metric and the subset of the detected anomalies in the digital time series data for the feature metric.

15. The computer program product of claim 11, wherein the unsupervised anomaly detection function automatically adjusts the predicted baseline model in response to changes in the digital time series data for the feature metric.

16. The computer program product of claim 11, wherein the unsupervised anomaly detection function uses group-level filtering or hypothesis testing to determine whether to label an anomaly detected by the unsupervised anomaly detection function.

17. The computer program product of claim 11, wherein the instructions, when executed by one or more processors, cause the one or more processors to perform operations comprising using a set of user-definable rules to rank the feature in relation to other features that are associated with other labeled anomalies.

18. The computer program product of claim 11, wherein when the feature is a numeric feature, the feature metric comprises any one or more of the following: a feature value mean, a feature quantile, and when the feature is a categorical feature, the feature metric comprises any one or more of the following: a feature count, a feature count ratio.

19. The computer program product of claim 14, wherein when the model output comprises a prediction, the model stability metric comprises an observed/estimated (O/E) ratio, and when the model output comprises a score, the model stability metric comprises a normalized discounted cumulative gain (NDCG) or a mean reciprocal rank (MRR).

20. The computer program product of claim 11, wherein the model output is used by the online system to configure any one or more of the following: a content recommendation, a connection recommendation, a job opportunity recommendation, a search query.

* * * * *